Feb. 1, 1938.   C. H. NORDELL   2,106,851
COMBINED STRAINING AND COMMINUTING APPARATUS
Filed July 2, 1936
Fig. 1.
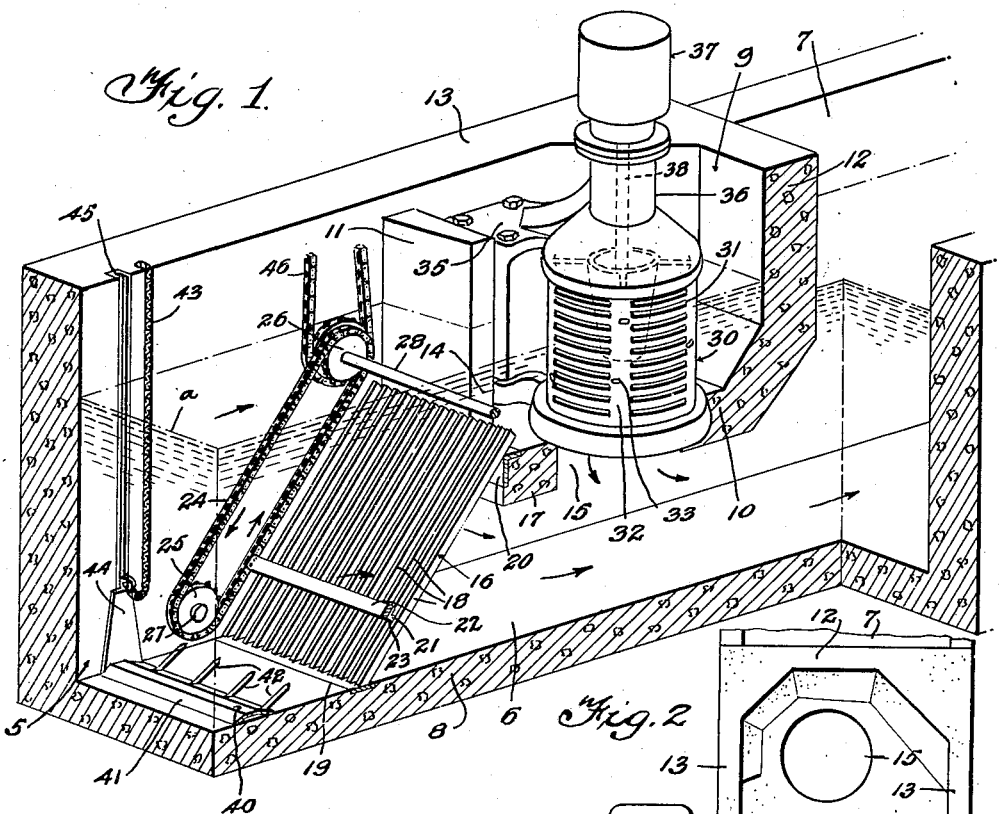
Fig. 2.
Fig. 5.
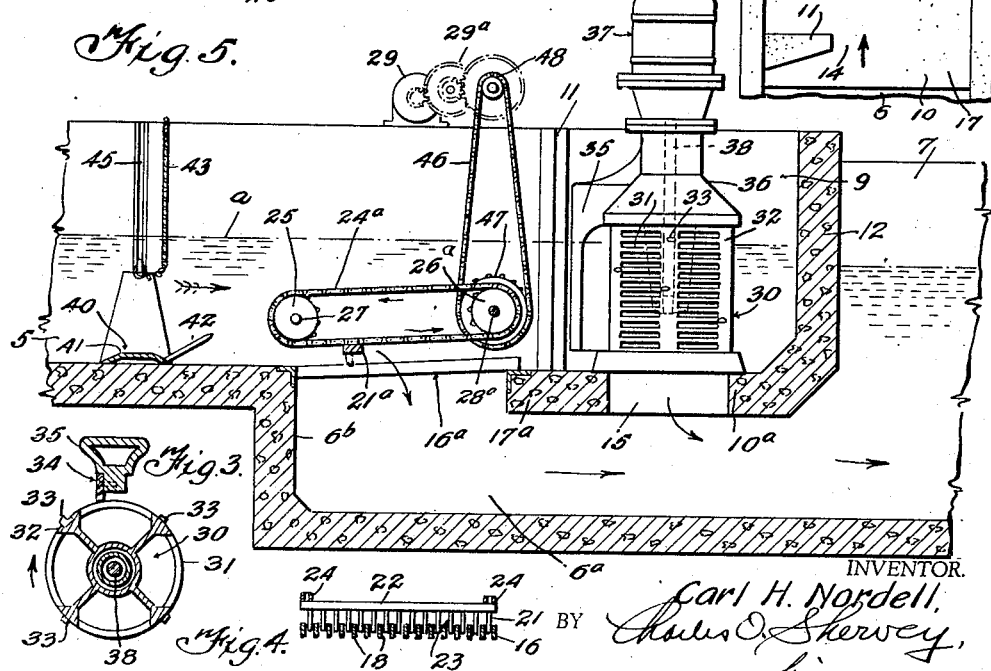
Fig. 3.
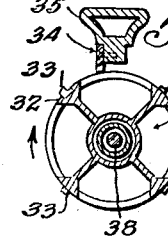
Fig. 4.
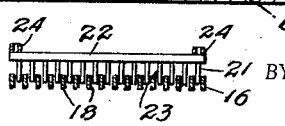
INVENTOR.
Carl H. Nordell,
BY Charles O. Shervey,
his ATTORNEY.

Patented Feb. 1, 1938

2,106,851

UNITED STATES PATENT OFFICE 2,106,851

COMBINED STRAINING AND COMMINUTING APPARATUS

Carl H. Nordell, Chicago, Ill., assignor to Chicago Pump Company, Chicago, Ill., a corporation of Illinois Application July 2, 1936, Serial No. 88,570

10 Claims. (Cl. 210—152)

This invention relates to straining and comminuting apparatus.

One of the objects of this invention is to provide combined straining and comminuting apparatus for handling great volumes of liquids which can be constructed at a moderately low cost.

The apparatus forming the subject matter of this specification has been designed for use in straining out solid and semi-solid matter from sewage, and reducing the solids and semi-solids to pieces that are small enough to pass through the comminuter along with the flowing stream, but it is not my intention to limit the use of the apparatus for this purpose, as there are many other situations where it may be used.

Some of the solids and semi-solids carried in sewage float upon or near the surface thereof and others are washed along with the stream, and one of the objects of this invention is to provide a comminuter or disintegrator, in combination with a main screen or strainer, and conveying means serving to rid the main screen or strainer of solids and semi-solids that are intercepted by it and to convey the same to the comminuter or disintegrator, whereby the strained liquids may freely pass through the main screen or strainer in great volumes.

In accordance with the present invention, any solids that may be intercepted by the main screen or by the comminuter are reduced to pieces small enought to pass through the comminuter along with the flow of liquid therethrough, whereby they may be discharged into the main stream or may be separately discharged as desired.

Another object is to provide means for detaining and removing large metal or heavy solids that may be carried to the apparatus along the bottom of the influent channel, whereby to prevent injury to the apparatus.

The proportion of solids and semi-solids carried in sewage water is relatively small, as compared with the amount of liquid, and therefore an ordinary grid screen or strainer of great capacity may be employed to strain the sewage, and one of the objects is to provide a comminuter of lesser capacity for handling the solids and semi-solids and reducing them to pieces small enough to pass through the comminuter and be discharged into the main stream, or to some other place, as desired. Great economy in the cost of combined straining and comminuting apparatus is therefore obtained with the use of apparatus disclosed in this specification.

Other objects and advantages will appear in the course of this specification, and with all of such objects and advantages in view, this invention consists in the several novel features of construction, arrangement and combination of parts hereinafter fully set forth and claimed.

The invention is clearly illustrated in the drawing accompanying this specification, in which:

Fig. 1 is a fragmental, perspective view, partly broken out, of a screen chamber and a comminuter chamber, illustrating one embodiment of the invention therein.

Fig. 2 is a fragmental plan of the screen chamber and comminuter chamber;

Fig. 3 is a detail, horizontal section through the strainer wall and cutting bar of the comminuter;

Fig. 4 is a fragmental, cross-section through the main screen or strainer; and

Fig. 5 is a fragmental, vertical, longitudinal section, illustrating a slightly modified form of the invention.

Referring to said drawing, and first to Figs. 1 to 4, inclusive, the reference character 5 designates an influent channel which discharges into a screen chamber 6, and 7 designates the effluent channel through which the strained liquids flow from the screen chamber to some other station for further treatment, usually a sewage treatment apparatus. Desirably the bottom 8 of the screen chamber is located in alignment with the bottoms of the influent and effluent channels.

In the screen chamber and spaced above the bottom thereof, is a comminuter chamber 9, which has a bottom wall 10, and walls 11, 12 and side walls 13, which side walls may form continuations of the side walls of the influent and effluent channels. The end wall 12 extends from one side wall to the other, the end wall 11 extends only part way from one side wall so as to leave an inlet opening 14 between the screen chamber and comminuter chamber, through which sewage may pass from the screen chamber into the comminuter chamber.

A discharge opening 15 is provided in the bottom wall 10 of the comminuter chamber, through which the strained sewage and comminuted material may discharge therefrom, either directly into the flowing stream of sewage therebelow, or into some other conduit, whereby the sewage which passes through the comminuter may be separated from that which passes directly through the screen chamber.

In advance of the comminuter chamber is a grid screen or strainer 16 of sufficient capacity to handle the greater part of the sewage. In the the form of the invention illustrated in Fig. 1, the grid screen extends upwardly from the bottom wall of the screen chamber, in a rearwardly inclined direction, to the upper side of a ledge or protruding part 17 of the bottom wall 10 of the comminuter chamber. The grid screen intercepts the passage through the screen chamber below the comminuter chamber and strains out solids and semi-solids that are carried along with the stream toward the passage below the comminuter chamber. The comminuter chamber with its inlet and outlet openings provides a by-pass for the stream, around the main straining wall, into which by-pass unstrained sewage flows.

The grid screen or strainer 16 may be of any approved form and, as shown, it comprises a plurality of parallel spaced bars 18 that extend from a foot plate 19 located on the bottom wall of the screen chamber to an angle plate 20 carried upon the upper outer corner of the protruding edge portion or ledge 17 of the comminuter chamber bottom. Suitable means are provided for spacing apart the screen bars 18 and, if desired, the foot plate 19 and angle plate 20 may be provided with spacing means for this purpose.

Solid and semi-solids carried along with the stream below the top of the grid screen are intercepted by the latter, and to prevent the grid screen from becoming clogged, a combined conveyor and scraper 21 is provided. Desirably the combined conveyor and scraper comprises one or more transversely extending bars 22, in some cases having rake teeth 23, that are adapted to enter and travel in the slots between the screen bars from the bottom end thereof to the upper end. The conveyor serves to convey the solids and semi-solids to the top of the grid screen and discharge them from the grid screen, whereby they may be carried along with the flow of the stream to the comminuter chamber.

Suitable means are provided for actuating the combined conveyor and scraper and, as shown, endless chains 24 are provided, one of which is shown in Fig. 1. The bar 22 is fastened to opposite links of the chains 24 and the chains are trained around sprocket wheels 25, 26, disposed at the sides of the grid screen and mounted upon shafts 27, 28. The shafts 27 may comprise short stub shafts that extend inward from the side walls, and the shaft 28 is journaled in bearings (not shown) and carries the sprocket wheels 26. The shaft 28 is connected to suitable power driving means, such as an electric motor 29 and speed reducing gearing 29ª (see Fig. 5).

Mounted in the comminuter chamber is a comminuter 30, desirably of the type which both comminutes and strains. A comminuter of this type is more fully shown and described in my former Patent Number 1,948,125, dated February 20, 1934. The comminuter 30 illustrated in the accompanying drawing is constructed substantially similar to that disclosed in the aforesaid patent, except that its cylindrical straining wall 31 is formed with upright ribs 32 which divide the slots of the cylindrical wall into segments and provide means upon which are secured the cutting teeth 33. The cutting bar 34 (see Fig. 3) instead of being toothed to engage in the slots of the cylindrical wall, is slotted to permit the cutting teeth to pass the bar, whereas the notched edge of the bar co-operates with the ends of the slots to cut off pieces that may have entered the slots and have become caught therein. The cutter bar is mounted on a standard 35, as in my prior patent, and said standard also supports a shield 36 which extends upward from the upper end of the cylindrical strainer wall. The cylindrical strainer wall is mounted to rotate on a vertical axis and is connected to an electric motor 37, by a shaft 38, as in the patent above referred to. The wall 11 of the comminuter chamber serves to protect the standard from the solids entering the comminuter chamber.

I do not desire to limit myself to the exact form of comminuter shown and described, as any equivalent mechanism for comminuting or disintegrating solids carried by a flowing stream may be substituted therefor.

The comminuter is located directly above the opening 15 in the bottom wall 10 of the comminuter chamber, whereby the strained sewage, entering the comminuter through the slots in its cylindrical wall, may discharge into the stream below the comminuter chamber or may be carried away by a separate conduit, as desired.

The normal level of the sewage passing through the screen chamber is indicated at, a, and, as shown, the normal level of the liquid is disposed above the grid screen and reaches almost to the top of the comminuter. This level fluctuates, from time to time, so that at a high stage it is likely to rise above the top of the comminuter and at a low stage is likely to fall below the top of the grid screen, although as a general thing the level is above the upper end of the grid screen.

To prevent metal or other heavy objects which are washed along or carried along by the stream to the apparatus from passing to the grid screen and damaging it, or damaging the conveyor, a guard 40 is provided in advance of the grid screen. The guard may comprise a cross-bar or plate 41, adapted to lie upon the bottom of the screen chamber, from which bar or plate projects a number of posts 42 that incline upward and rearward toward the grid screen and serve to detain large metal or heavy objects without obstructing the passage of the liquid and smaller objects. Means are provided whereby the guard may be raised to the top of the screen chamber and said means may comprise cables 43 attached to the cross-bar or plate 41, or to upstanding ears 44 thereof. Desirably the ears may be guided in ways 45.

In the operation of the apparatus shown in Fig. 1, the liquid and the solids and semi-solids floating thereon or carried along with the stream, enter the screen chamber and the liquid passes through the slots in the grid screen 16 and then flows through the screen chamber underneath the comminuter chamber and out through the effluent channel. That part of the stream flowing above the grid screen enters the comminuter chamber through the opening 17 between the end wall 11 and the opposite wall 13, the liquid and small pieces passing through the slotted wall of the comminuter, whereas the solids that are too large to pass through the slots in the wall of the comminuter are detained thereby.

Debris, trash and other solid and semi-solid matter, detained by the main screen or strainer wall, are scraped therefrom and conveyed along the latter by the conveyor and finally discharged therefrom, along with the flow of the stream, to the comminuter chamber, where the comminuter reduces the same into pieces of small enough size to pass through the slots of the strainer wall of the comminuter along with the stream.

The conveyor and the comminuter may remain idle, if desired, except when the strainer walls become more or less clogged. However, if the accumulation of solids on the strainer walls is considerable at all times, it is preferable to operate the conveyor and comminuter continuously.

In the modified form of the invention illustrated in Fig. 5, the screen chamber is provided with a depressed part 6a and the bottom wall 10a of the comminuter chamber is lowered to a position approximately in alignment with the bottom of the influent channel, and the grid screen or strainer wall 16a placed across the space between the upright wall 6b and the ledge 17a of the bottom wall of the comminuter chamber. In this construction the grid screen or strainer wall 16a lies in an approximately horizontal position, and the combined conveyor and scraper 21a and its propelling chains 24a extend in the same direction. If desired the shaft 28a for the sprocket wheels 26a may be driven from the motor 29 at the top of the screen chamber by an upright sprocket chain 46 trained around a sprocket wheel 47 on the shaft 28a and a sprocket wheel 48 on the drive shaft of the speed reducing gearing 29a.

The comminuter, and other operating mechanism, may be of substantially the same construction as the corresponding parts of the preferred form.

The operation of the modified form of the apparatus is substantially the same as that of the preferred form. In this case, however, strained sewage falls through the grid screen into the depressed part of the screen chamber, and the matter detained by the grid screen is scraped from the same and conveyed to the comminuter chamber, where it is reduced to pieces small enough to pass through the strainer wall of the comminuter along with the flow of the stream therethrough.

In both forms of the invention a by-pass is formed by the comminuter chamber with its inlet and outlet openings around the stationary straining wall for diverting some of the flow of sewage from its main course to the comminuter. Furthermore, in both forms of the invention illustrated, the discharge end of the comminuter is located in the upper part of the stream, whereby comminuted material may discharge, by gravity, from the comminuter into the flowing stream, or elsewhere, as desired.

From the above it is apparent that great volumes of liquids can be handled by the main screen and that the solids can be taken care of by a relatively small comminuter. Moreover, the solids need not be removed from the liquids, but are comminuted at or under the surface of the flowing stream, thereby eliminating much of the stench which accompanies sewage.

I claim as new and desire to secure by Letters Patent:

1. Combined straining and comminuting apparatus, comprising in combination a strainer wall interposed in a flowing stream, a by-pass for the stream, around the strainer wall, and a comminuter disposed in said by-pass, one end of the strainer wall being disposed adjacent the comminuter.

2. Combined straining and comminuting apparatus, comprising in combination a strainer wall interposed in a flowing stream, a by-pass for the stream around the strainer wall, a comminuter disposed in the by-pass, one end of the strainer wall being disposed adjacent the comminuter, and a conveyor element traveling along said strainer wall toward the comminuter and arranged to convey matter, collected from the strainer wall, to the comminuter along with the flow of the stream thereto.

3. Combined straining and comminuting apparatus, comprising in combination a stationary strainer wall interposed in a flowing stream, a by-pass for the stream, around the strainer wall, a comminuter having a straining wall interposed in the by-pass, one end of the stationary strainer wall being disposed adjacent the comminuter, and a conveyor element traveling along the stationary strainer wall and toward the comminuter, and arranged to convey matter, collected from the strainer wall, to the comminuter along with the flow of the stream thereto.

4. Combined straining and comminuting apparatus, comprising in combination a screen chamber through which a flowing stream passes, a comminuter chamber disposed in the upper part of the stream and having an inlet opening thereto from the screen chamber, and a discharge opening through which liquid and comminuted material is discharged from the comminuter chamber, a stationary straining wall interposed in that part of the stream which flows beneath the comminuter chamber one end of the straining wall being disposed adjacent the inlet to the comminuter chamber, a comminuter in said comminuter chamber disposed in the flow of the upper part of the stream, and above said discharge opening, and a conveyor element traveling along said stationary straining wall and arranged to convey matter, collected from the stationary straining wall, to the inlet opening to the comminuter chamber.

5. Combined straining and comminuting apparatus, comprising in combination a screen chamber through which a flowing stream passes, a comminuter chamber disposed in the upper part of the stream and having an inlet opening, leading from the upper part of the screen chamber and a discharge opening, through which liquid and comminuted material discharges by gravity from the comminuter chamber, a stationary inclined straining wall interposed in that part of the stream which flows beneath the comminuter chamber, a comminuter in said comminuter chamber having a strainer wall disposed in the flow in the upper part of the stream, and above said discharge opening, and a conveyor element traveling along said stationary straining wall and arranged to convey matter, collected from the stationary straining wall, to the inlet opening to the comminuter chamber.

6. Combined straining and comminuting apparatus, comprising in combination a screen chamber through which a flowing stream passes, a comminuter chamber disposed in the upper part of said stream and having an inlet opening thereto from the screen chamber, and a discharge opening through which liquid and comminuted material discharges from the comminuter chamber, an approximately horizontal straining wall interposed in that part of the stream which flows beneath the comminuter chamber, a comminuter in said comminuter chamber having a cylindrical strainer wall disposed in the flow of the stream through the comminuter chamber, and above said discharge opening, and a conveyor element traveling along said straining wall and arranged to convey matter, collected from the straining wall, to the inlet opening to the comminuter chamber.

7. Combined straining and comminuting apparatus, comprising in combination a screen chamber through which a flowing stream passes, a comminuter chamber disposed in the upper part of the stream having an inlet opening, leading from the screen chamber and a discharge opening discharging into the strained part of the stream, a stationary straining wall extending from the inlet opening to the comminuter chamber interposed in that part of the stream which flows beneath the comminuter chamber, a comminuter in said comminuter chamber having a strainer wall disposed in the flow of the stream through the comminuter chamber, and above said discharge opening, and a conveyor element traveling along said stationary straining wall and arranged to convey matter, collected from the stationary straining wall, to the inlet opening to the comminuter chamber.

8. Combined straining and comminuting apparatus, comprising in combination a grid screen interposed in a flowing stream, a by-pass for the stream, around the screen, a comminuter interposed in that part of the stream passing through the by-pass, a combined conveyor and scraper traveling along said grid screen and arranged to convey matter, collected from said grid screen, to the comminuter, along with the flow of the stream, and driving mechanism for said combined conveyor and scraper.

9. The combination of a screen chamber having side and bottom walls, a comminuter chamber therein having an end wall and a bottom wall extending between the side walls of the screen chamber, the bottom of the screen chamber being in part located below the bottom wall of the comminuter chamber and said comminuter chamber having an inlet, opening thereto, from the screen chamber, and a discharge opening, leading to the screen chamber, a grid screen extending between the bottom of the screen chamber to the bottom of the comminuter chamber, a comminuter in said comminuter chamber having a strainer wall above and around said discharge opening, and scraping means for ridding the grid screen of solids and semi-solids.

10. In combination, a screen chamber through which a flowing stream passes, a stationary straining wall interposed in said stream, a by-pass for the stream in the form of a comminuter chamber having an inlet, opening to said stream on one side of said straining wall and having also a discharge opening on the other side of the straining wall, whereby part of the stream is diverted through the comminuter chamber, and a comminuter in the comminuter chamber having a strainer wall enclosing the discharge opening in the comminuter chamber.

CARL H. NORDELL.